United States Patent [19]

Dressler et al.

[11] Patent Number: 4,635,173
[45] Date of Patent: Jan. 6, 1987

[54] HEADLIGHT FOR MOTOR VEHICLES

[75] Inventors: Helmut Dressler, Leutenbach; Peter Engenhart, Korntal; Klaus Jahnel, Stuttgart; Heinrich Kochendörfer, Kernen; Ulrich Kuhn, Renningen; Karl H. Matthäs, Stuttgart; Kurt Schuster, Reutlingen, all of Fed. Rep. of Germany

[73] Assignee: Robert Bosch GmbH, Stuttgart, Fed. Rep. of Germany

[21] Appl. No.: 829,700

[22] Filed: Feb. 13, 1986

[30] Foreign Application Priority Data

Apr. 11, 1985 [DE] Fed. Rep. of Germany ....... 3512882

[51] Int. Cl.⁴ .............................................. B60Q 1/06
[52] U.S. Cl. ..................................... 362/294; 362/61; 362/345; 362/373
[58] Field of Search ................. 362/294, 61, 345, 218, 362/373, 307, 310, 311

[56] References Cited

U.S. PATENT DOCUMENTS

| | | | |
|---|---|---|---|
| 1,281,754 | 10/1918 | Beck | 362/345 |
| 1,767,526 | 6/1930 | House | 362/345 |
| 2,007,489 | 7/1935 | Westberg | 362/345 |
| 3,224,321 | 12/1965 | Beck | 362/294 |
| 3,325,637 | 6/1967 | Honda | 362/345 |
| 3,388,249 | 6/1968 | Siegal et al. | 362/345 |
| 4,249,232 | 2/1981 | Dick | 362/294 |
| 4,302,801 | 11/1981 | Duddy | 362/294 |
| 4,329,738 | 5/1982 | Heinz et al. | 362/61 |
| 4,569,007 | 2/1986 | Dick | 362/294 |

FOREIGN PATENT DOCUMENTS 3004413  6/1932  Fed. Rep. of Germany ...... 362/294

Primary Examiner—Raymond A. Nelli
Attorney, Agent, or Firm—Michael J. Striker

[57] ABSTRACT

In a headlight of a motor vehicle, having a housing and a diffusing lens enclosing with the housing an interior of the headlight, the interior is vented by means of a conduit exposed to air streams caused by travelling of the motor vehicle. The conduit is formed as an integrated part of the diffusing lens made of plastics.

13 Claims, 4 Drawing Figures

HEADLIGHT FOR MOTOR VEHICLES

BACKGROUND OF THE INVENTION

The present invention relates to a headlight for motor vehicles.

Headlights of the foregoing type normally include a housing with a reflector and a diffusing lens which together with the housing hermetically encloses an interior of the headlight.

One of conventional headlights of the type under discussion has been disclosed in DE-OS No. 30 04 413. In this conventional headlight, an air conduit is secured in the housing in the region of the air outlet by a catch. Thereby the distance of an outflow opening of the conduit to the adjacent part of the body of the motor vehicle is relatively small so that necessary through streams of air, caused by travelling of the vehicle can not be ensured through that conduit and therefore the interior of the headlight is not always vented as desired.

SUMMARY OF THE INVENTION

It is an object of the present invention to provide an improved headlight for motor vehicles.

It is another object of the present invention to provide a headlight with improved ventilation.

These and other objects of the invention are attained by a headlight for a motor vehicle, comprising a housing with a reflector and a diffusing lens which hermetically encloses and forms with said housing an interior of the headlight, said headlight having an air inlet positioned in a bottom part thereof and an air outlet diametrally opposing said inlet; a conduit exposed to air streams due to travelling of the motor vehicle, said outlet opening into said conduit, said conduit having an inflow opening for admitting air of the air streams and an outflow opening for discharging said air, said conduit being positioned on said diffusing lens made of plastics.

The chief advantage of the present invention resides in that the air venting conduit is formed as an integrated part of the diffusing lens made of synthetic plastic material. Therefore there is no longer necessary to make a separate element for venting air, and the outflow opening in the arrangement according to this invention is positioned outside the region of the vehicle body so that this opening is exposed to air streams during the travelling of the vehicle without any obstacles, and a predetermined air exchange in the interior of the headlight is continually ensured.

In the headlight, in which said housing and said diffusing lens each has a rectangular cross-section, said air inlet may be formed in an underside of said housing and near one corner thereof, said outflow opening being positioned at an upper side of said diffusing lens at an opposite corner thereby diametrally opposing to said one corner of the housing.

The diffusing lens may have an optical plate having a closed flange with two vertical sides, said conduit being positioned in the region of one of said vertical sides and an edge of said optical plate, said inflow opening and said outflow opening being formed approximately parallel to a direction of travelling of the motor vehicle.

The outflow opening may have two overlapping edges, one of said edges facing said direction of travelling, said inflow opening being flush with an underside of said diffusing lens.

In the headlight, in which the diffusing lens has an optical plate with an enclosed flange with two shorter vertical sides and an upper and a lower longer horizontal sides, the conduit may be arranged in the region of an edge which is formed by the upper longer side and one of said shorter vertical sides, said inflow opening and said outflow opening being formed transversely of said direction of travelling.

The upper horizontal side and said one shorter side of said flange may form walls of said conduit.

The above mentioned modifications of the conduit arrangement provide for a technically favorable manufacture of the diffusing lens.

Said conduit may be positioned on the upper side of said flange, said one shorter side having an extension which forms an outer wall of said conduit.

The housing may have a conduit extension which is attached to said conduit positioned on said diffusing lens.

In the headlight formed as a headlight-blinker light unit and including a blinker light laterally attached to the headlight and having a housing and a transparent pane hermetically enclosing and forming with said housing a closed interior which has an air inlet and an air outlet, the blinker light may have an additional conduit exposed to air streams, said outlet opening into said additional conduit, said conduit of the headlight and said additional conduit of the blinker light being positioned on an ajoining vertical side of said flange and superposing one another, the air outlet of the blinker light being arranged in a lateral portion of said pane and below the air outlet of the headlight, whereby the interior of the blinker light can be vented simultaneously with that of the headlight.

The inflow opening of each conduit may widen in said direction of travelling.

The inflow opening of each conduit may have the shape of a downwardly widening funnel, whereby inflow amounts of air into each conduit are increased.

Said inflow opening may be formed by a plurality of parallel slots in said diffusing lens.

The air outlet of the headlight and the air outlet of the blinker light each may be formed by a tubular connection extended into a respective conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
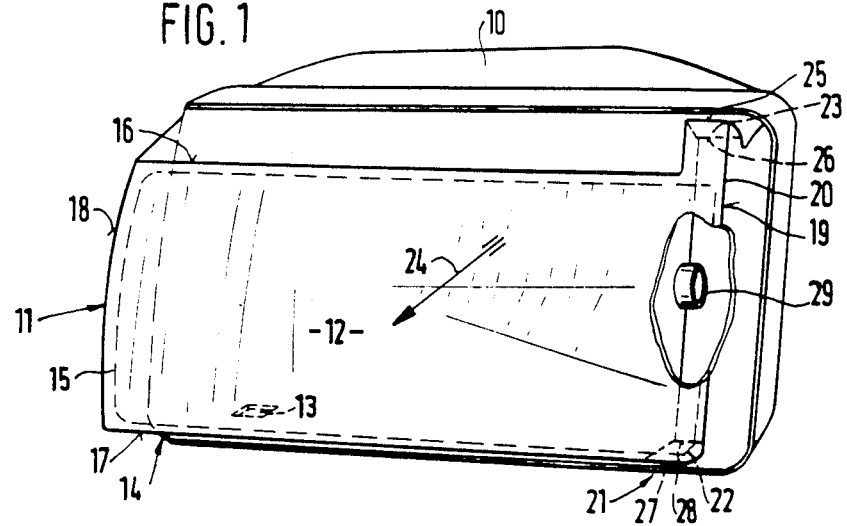
FIG. 1 is front view of the vehicle headlight with the air conduit according to a first embodiment of the invention.

Referring now to the drawings in detail, and firstly to FIG. 1 thereof, this figure illustrates a headlight which has a housing 10 and a diffusing lens 11, both of which form a hermetically closed interior 12. A non-shown reflector and a lamp are secured in the housing. An air inlet 13 leading to the atmosphere is positioned at the underside and near the corner 14 of the housing 10.

The diffusing lens 11 has an optical plate 15 and an enclosed rectangular flange with longitudinal or longer sides 16 and 17 and shorter vertical sides 18, 19. In the region of the edge portion 20 formed by the shorter side 19 and the optical plate 15, is provided an air conduit 21 which has a lower inlet opening 22 and an upper outlet opening 23. The walls of both openings 22 and 23 extend approximately parallel with respect to the travel direction of the motor vehicle denoted by arrow 24, provided, however, that edge 25 of the outlet opening 23 overlaps the opposite edge 26 but edges 27, 28 of the inlet opening 22 lie flush with the underside of the diffusing lens. Diametrally opposing to the air inlet 13 extends in the conduit 21 a tubular connection 29 which forms an air outlet for the interior 12 of the housing 10.

A continual air exchange in the interior 12 of the headlight is obtained during the movement of the vehicle in the following manner:

An air-stream acting opposite to the travel direction 24 forms at the outlet or outflow opening 23 a suction whereby the external air enters passage 21 through the inlet or inflow opening 22 and flows through that passage. Suction also eventually takes place at the outlet opening 29, whereby air flows from the interior 12 of the headlight into the conduit 21 while, at the same time, external air flows through the air inlet 13 into the interior 12.

Figure 2:
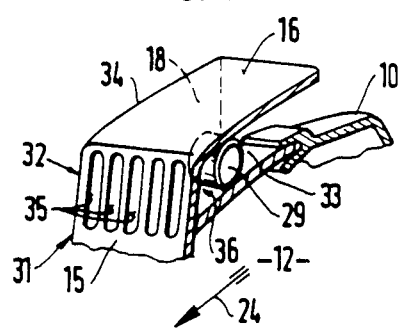
FIG. 2 is a partial perspective view, partially in section, of the headlight with the air conduit of the second embodiment.

In the modified embodiment shown in FIG. 2, the diffusing lens is designated by reference numeral 31. This lens has the upper elongated side 16 and the shorter side 18 of the flange, whereby a conduit 36 is provided in the region of the edge 34 common to the sides 16 and 18. The horizontal side 16 and the vertical side of wall 18 also form two outer sides of the air conduit 36.

An inflow opening 32 and an outflow opening 33 are positioned tranversely of the travel direction 24 so that an air-stream acting counter to the direction of arrow 24 passes through conduit 36 in the direction of elongation, and thereby the above-described suction is caused at the outlet opening 29. The inflow opening 32 is formed by a plurality of parallel slots 35 provided at the corner of the optical plate 15 which is made of the same plastics as that of the diffusing lens 31.

Figure 3:
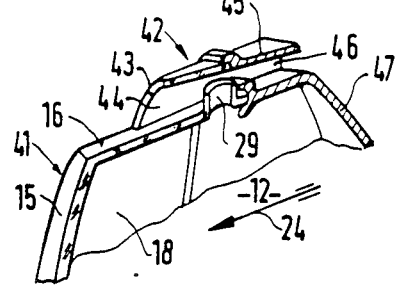
FIG. 3 is a partial perspective view of the modified embodiment of the invention.

In the embodiment of FIG. 3, a diffusing lens 41, made of plastics, has a conduit 42 which is not integrated in the optical plate 15 of the lens, as is the case in the embodiments of FIGS. 1 and 2, but is set on the upper elongated side 16 of the flange. The outer side or wall 43 of the passage 42 is flush with the shorter side or wall 18 of the diffusing lens 41, thus the outer side or wall 43 is an extension of the shorter side or wall 18. An inflow opening 44 of the conduit 42 is completely open and is inclined in the vertical direction relative to the travel direction denoted by arrow 24. A conduit extension 45 is formed on the housing 10, which extension has the same cross-section as that of the conduit 42 and is attached to the same. Conduit extension 45 has an outflow opening 46.

Figure 4:
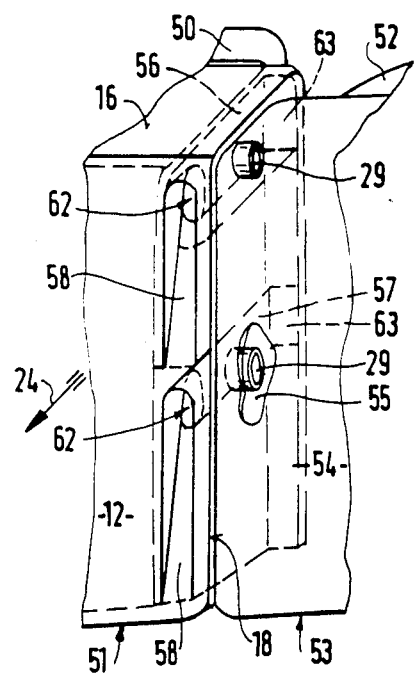
FIG. 4 is a partial perspective view of the headlight-blinker lamp-unit.

In a further modified embodiment shown in FIG. 4, a headlight-blinker unit is provided, which has a housing 50 with an assigned diffusing lens 51 and a housing 52 of the blinker light or lamp with an assigned transparent pane 53; pane 53 and housing 52 form a hermetically closed interior or chamber 54 in which air flows which has been admitted from the atmosphere through the bottom air inlet oriented to the outer side and non-shown, in the manner as described with reference to FIG. 1. In a lateral portion 55, which is adjacent the diffusing lens 53, an air outlet 29, formed as a tubular outwardly projecting connection, is provided.

An air conduit 56 is arranged at the shorter side 18 and on the upper region of the diffusing lens, facing the interior 12. An air outlet 29 of the housing 12 opens into the conduit 56. The latter has an inflow opening 62 and an outflow opening 63 in the direction of travel of the vehicle 24. Below the conduit 56 and in the same direction, is provided a second air conduit 57 with the inflow opening 62 and the outflow opening 63. An air outlet opening 29 of the blinker light, formed as a tubular connection, extends into the conduit 57. The inflow opening 62 of each conduit 56, 57 widens in the direction of arrow 24 and forms a downwardly extended funnel 58 whereby greater amounts of air can be admitted into the respective passages. The open part of the funnel 58 can be also formed as slots 35 of the embodiment of FIG. 2.

The air exchange in the chamber 54 of the blinker light will be obtained through the conduit 57 in the same manner as that for the interior or chamber 12.

It will be understood that each of the elements described above, or two or more together, may also find a useful application in other types of headlights for motor vehicles differing from the types described above.

While the invention has been illustrated and described as embodied in a headlight for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a motor vehicle, comprising a housing with a reflector, and a diffusing lens which hermetically encloses and forms with said housing an interior of the headlight, said housing having an air inlet positioned in a bottom part thereof and an air outlet diametrally opposing said inlet; and a conduit exposed to air streams due to travelling of the motor vehicle, said outlet opening into said conduit, said conduit having an inflow opening for admitting air of the air streams, and an outflow opening for discharging said air, said conduit being positioned on said diffusing lens which is made of plastics.

2. The headlight as defined in claim 1, in which said housing and said diffusing lens each has a rectangular cross-section, said air inlet being formed in an underside of said housing and near one corner thereof, said outflow opening being positioned at an upper side of said diffusing lens at a corner thereof diametrically opposing to said one corner of the housing.

3. The headlight as defined in claim 2, wherein said diffusing lens has an optical plate having a closed flange with two vertical sides, said conduit being positioned in the region of one of said vertical sides and an edge of said optical plate, said inflow opening and said outflow opening being formed approximately parallel to a direction of travelling of the motor vehicle.

4. The headlight as defined in claim 3, wherein said outflow opening has two overlapping edges, one of said edges facing said direction of travelling, said inflow opening being flush with an underside of said diffusing lens.

5. The headlight as defined in claim 2, in which said diffusing lens has an optical plate with an enclosed flange with two shorter vertical sides and an upper and a lower longer horizontal sides, said conduit being arranged in the region of an edge which is formed by the upper longer side and one of said shorter vertical sides, said inflow opening and said outflow opening being formed transversely of a direction of travelling of said motor vehicle.

6. The headlight as defined in claim 5, wherein said upper horizontal side and said one shorter side of said flange form walls of said conduit.

7. The headlight as defined in claim 5, wherein said conduit is positioned on the upper side of said flange, said one shorter side having an extension which forms an outer wall of said conduit.

8. The headlight as defined in claim 7, wherein said housing has a conduit extension which is attached to said conduit in said diffusing lens.

9. The headlight for a motor vehicle formed as a headlight-blinker light unit, as defined in claim 5, and including a blinker lgiht laterally attached to the headlight and having a housing and a transparent pane hermetically enclosing and forming with said housing a closed interior which has an air inlet and an air outlet, wherein the blinker light has an additional conduit exposed to air streams, said outlet opening into said additional conduit, said conduit of the headlight and said additional conduit of the blinker light being positioned on an ajoining vertical side of said flange and superposing one another, the air outlet of the blinker light being arranged in a lateral portion of said pane and below the air outlet of the headlight.

10. The headlight as defined in claim 9, wherein the inflow opening of each conduit widens in said direction of travelling.

11. The headlight as defined in claim 10, wherein the inflow opening of each conduit has the shape of a downwardly widening funnel.

12. The headlight as defined in claim 9, wherein said inflow opening is formed by a plurality of parallel slots in said diffusing lens.

13. The headlight as defined in claim 9, wherein the air outlet of the headlight and the air outlet of the blinker light each is formed by a tubular connection extended into a respective conduit.

* * * * *